United States Patent
Bowater

(10) Patent No.: US 12,331,853 B2
(45) Date of Patent: Jun. 17, 2025

(54) COUPLING

(71) Applicant: Ideal Clamp Products, Inc., Smyrna, TN (US)

(72) Inventor: Bruce D. Bowater, Nolensville, TN (US)

(73) Assignee: Ideal Clamp Products, Inc., Smyrna, TN (US)

( * ) Notice: Subject to any disclaimer, the term of this patent is extended or adjusted under 35 U.S.C. 154(b) by 0 days.

(21) Appl. No.: 18/409,588

(22) Filed: Jan. 10, 2024

(65) Prior Publication Data
US 2024/0229987 A1    Jul. 11, 2024

Related U.S. Application Data

(60) Provisional application No. 63/438,359, filed on Jan. 11, 2023.

(51) Int. Cl.
*F16L 21/00* (2006.01)
*F16L 25/14* (2006.01)

(52) U.S. Cl.
CPC ........... *F16L 21/005* (2013.01); *F16L 21/007* (2013.01); *F16L 25/14* (2013.01)

(58) Field of Classification Search
CPC ......... F16L 17/02; F16L 17/025; F16L 17/03; F16L 17/032; F16L 17/035; F16L 17/04; F16L 21/005; F16L 21/00; F16L 21/002; F16L 27/10; F16L 27/103; F16L 27/107; F16L 25/14
See application file for complete search history.

(56) References Cited

U.S. PATENT DOCUMENTS

| | | | |
|---|---|---|---|
| 3,233,922 | A | 2/1966 | Evans |
| 3,359,017 | A | 12/1967 | Schaub |
| 3,402,946 | A | 9/1968 | Dedian |
| 3,558,164 | A | 1/1971 | Havell |
| 3,837,683 | A | 9/1974 | Taylor |

(Continued)

FOREIGN PATENT DOCUMENTS

CA    981723 A    1/1976

OTHER PUBLICATIONS

Cast Iron Soil Pipe Institute, "Cispi Designation 310-20: Specification for Coupling for Use in Connection with Hubless Cast Iron Soil Pipe and Fittings for Sanitary and Storm Drain, Waste, and Vent Piping Applications," Oct. 19, 2020, 36 pages.

*Primary Examiner* — Aaron M Dunwoody
(74) *Attorney, Agent, or Firm* — Barnes & Thornburg LLP

(57) ABSTRACT

A coupling is configured to connect to an end of a pipe. The coupling includes a shield configured to surround the end of the pipe, a clamping band configured to be tightened around the shield and the end of the pipe, and an elastomeric gasket configured to lie between the shield and the pipe. The elastomeric gasket includes a first thickened region, a second thickened region spaced apart from the first thickened region, a circumferential support band interconnecting the first and second thickened regions, the circumferential support band being spaced apart from the pipe before the clamping band is tightened to provide a groove between the first and second thickened regions, and a sealing rib coupled to a radially inner surface of the circumferential support band and arranged to lie within the groove in contact with the pipe.

14 Claims, 3 Drawing Sheets

(56) References Cited

U.S. PATENT DOCUMENTS

| | | | |
|---|---|---|---|
| 3,933,377 | A | 1/1976 | Arrowood |
| 4,101,151 | A | 7/1978 | Ferguson |
| 4,380,348 | A | 4/1983 | Swartz |
| 4,538,837 | A | 9/1985 | Cronk |
| 4,538,839 | A | 9/1985 | Ledgerwood |
| 4,564,220 | A | 1/1986 | Sills et al. |
| 4,726,611 | A | 2/1988 | Sauer |
| 5,039,137 | A | 8/1991 | Cankovic et al. |
| 5,163,717 | A | 11/1992 | Wise |
| 5,431,458 | A * | 7/1995 | Schaub .................. F16L 25/14 285/236 |

* cited by examiner

COUPLING

CROSS-REFERENCE TO RELATED APPLICATIONS

This application claims the benefit of U.S. Provisional Patent Application No. 63/438,359, filed Jan. 11, 2023, which is incorporated by reference herein in its entirety.

BACKGROUND

The present disclosure relates to couplings and, more particularly, to couplings configured to join pipe segments together. As described in U.S. Pat. No. 5,431,458, which is incorporated by reference herein in its entirety, such couplings are frequently used in drain, waste, and vent piping applications. Further background information may be found in Cast Iron Soil Pipe Institute (CISPI) Designation 310-20, titled "Specification for Coupling for Use in Connection with Hubless Cast Iron Soil Pipe and Fittings for Sanitary and Storm Drain, Waste, and Vent Piping Applications," which is incorporated by reference herein in its entirety.

SUMMARY

According to one aspect of the present disclosure, a coupling may be configured to connect to an end of a pipe. The coupling may comprise a shield configured to surround the end of the pipe, a clamping band configured to be tightened around the shield and the end of the pipe, and an elastomeric gasket configured to lie between the shield and the pipe. The elastomeric gasket may comprise a first thickened region, a second thickened region spaced apart from the first thickened region, a circumferential support band interconnecting the first and second thickened regions, the circumferential support band being spaced apart from the pipe before the clamping band is tightened to provide a groove between the first and second thickened regions, and a sealing rib coupled to a radially inner surface of the circumferential support band and arranged to lie within the groove in contact with the pipe.

In some embodiments, the second thickened region provides an axial end of the elastomeric gasket. In some embodiments, the sealing rib is arranged closer to the first thickened region than the second thickened region. In some embodiments, the groove has a total length between the first and second thickened regions. In some embodiments, the sealing rib is spaced from the first thickened region by a distance that is less than $1/3$ of the total length. In other embodiments, the distance is less than $1/4$ of the total length.

In some embodiments, after being tightened, the clamping band is configured to assume an inclined orientation relative to a central axis of the coupling. In some embodiments, prior to tightening the clamping band, the entire radially inner surface of the circumferential support band of the elastomeric gasket is spaced apart from the pipe. In some embodiments, after tightening the clamping band, a first portion of the radially inner surface of the circumferential support band engages the pipe while the sealing rib maintains spacing between a second portion of the radially inner surface of the circumferential support band and the pipe.

In some embodiments, the sealing rib is a first sealing rib, and the elastomeric gasket further comprises a second sealing rib coupled to the radially inner surface of the circumferential support band and located axially between the first sealing rib and the second thickened region. In some embodiments, the first sealing rib is arranged closer to the first thickened region than the second thickened region. In some embodiments, the second sealing rib is spaced from the second thickened region by at least half of a distance between the first and second thickened regions.

In some embodiments, the sealing rib has a rhombus-shaped cross section, and a surface of the sealing rib facing the first thickened region defines an acute angle with a plane perpendicular to a central axis of the coupling. In some embodiments, the acute angle is configured to decrease in response to exertion of a pulling force on the pipe in a direction away from the plane.

According to another aspect of the present disclosure, an elastomeric gasket may be configured to engage with and seal between two pipes that are connected by a coupling including the elastomeric gasket. The elastomeric gasket may comprise a first pipe-coupling segment, a second pipe-coupling segment spaced apart from the first pipe-coupling segment, and a pipe-spacing segment arranged between and interconnecting the first and second pipe-coupling segments. The first and second pipe-coupling segments may each comprise a first thickened region coupled to the pipe-spacing segment, a second thickened region spaced apart from the first thickened region, a circumferential support band interconnecting the first and second thickened regions and cooperating with the first and second thickened regions to provide a groove between the first and second thickened regions, and a sealing rib arranged within the groove.

In some embodiments, the elastomeric gasket has a generally cylindrical shape defined around a central axis. In some embodiments, each groove is positioned closer to the central axis than the corresponding circumferential support band. In some embodiments, each sealing rib is an annular rib extending from a radially inward surface of the corresponding circumferential support band into the corresponding groove.

In some embodiments, each sealing rib is arranged closer to the corresponding first thickened region than the corresponding second thickened region. In some embodiments, each groove has a total length between the corresponding first and second thickened regions. In some embodiments, the sealing rib is spaced from the corresponding first thickened region by a distance that is less than $1/3$ of the total length. In other embodiments, the distance is less than $1/4$ of the total length.

According to yet another aspect of the present disclosure, a method may comprise inserting an end of a first pipe into a first end of a coupling such that a first portion of an elastomeric gasket of the coupling is positioned between the end of the first pipe and a first clamping band of the coupling and tightening the first clamping band around the first portion of the elastomeric gasket. The first portion of the elastomeric gasket may comprise a first thickened region, a second thickened region spaced apart from the first thickened region, a first circumferential support band interconnecting the first and second thickened regions and cooperating with the first and second thickened regions to provide a first groove adjacent the first pipe, and a first sealing rib coupled to the first circumferential support band and arranged to lie within the first groove in contact with the first pipe.

In some embodiments, the method further comprises inserting an end of a second pipe into a second end of the coupling such that a second portion of the elastomeric gasket of the coupling is positioned between the end of the second pipe and a second clamping band of the coupling, and tightening the second clamping band around the second portion of the elastomeric gasket. The second portion of the elastomeric gasket may comprise a third thickened region, a fourth thickened region spaced apart from the third thickened region, a second circumferential support band interconnecting the third and fourth thickened regions and cooperating with the third and fourth thickened regions to provide a second groove adjacent the second pipe, and a second sealing rib coupled to the second circumferential support band and arranged to lie within the second groove in contact with the second pipe.

In some embodiments, the coupling further comprises a shield positioned between the elastomeric gasket and the first clamping band and between the elastomeric gasket and the second clamping band.

In some embodiments, tightening the first clamping band causes the first clamping band to move from a parallel orientation, in which the first clamping band is substantially parallel to an outer diameter of the first pipe, to an inclined orientation, in which the first clamping band is arranged at an angle relative to the outer diameter of the first pipe. In some embodiments, a first portion of a radially inner surface of the first circumferential support band of the elastomeric gasket moves toward and engages the outer diameter of the first pipe as the first clamping band moves from the parallel orientation to the inclined orientation, but the first sealing rib maintains spacing between a second portion of the radially inner surface of the first circumferential support band and the outer diameter of the first pipe.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The concepts described in the present disclosure are illustrated by way of example and not by way of limitation in the accompanying drawings. Where considered appropriate, reference labels have been repeated among the drawings to indicate corresponding or analogous elements. The detailed description particularly refers to the accompanying drawings in which.

DETAILED DESCRIPTION

Figure 1:
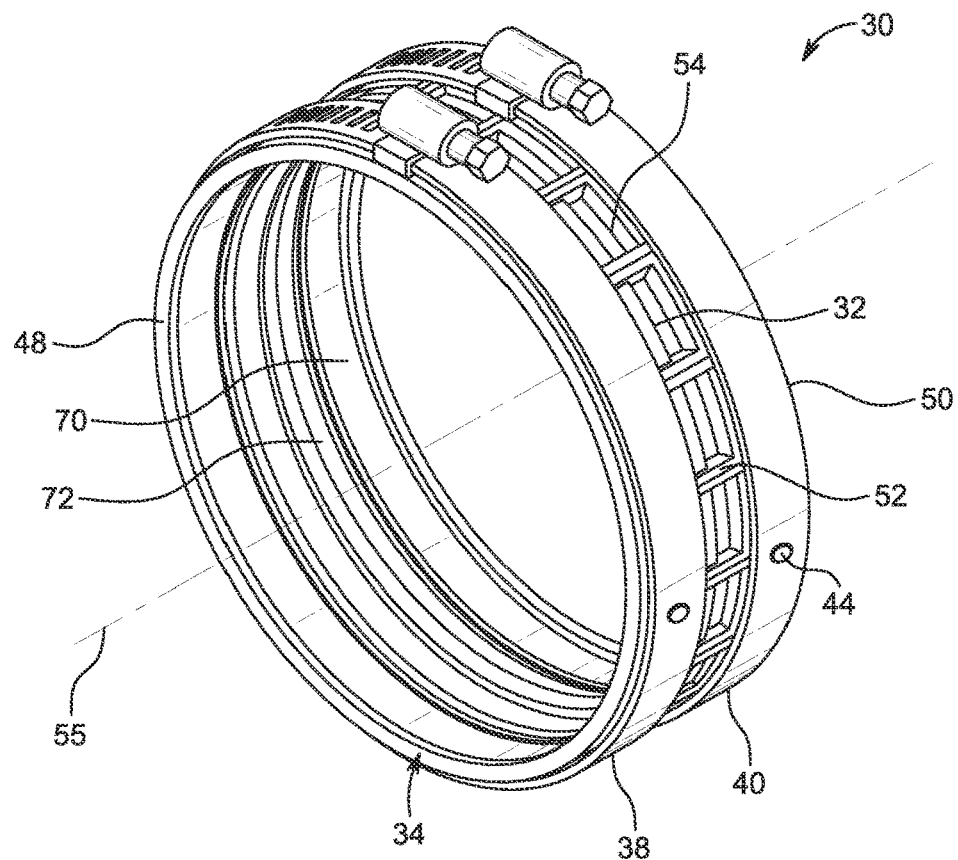
FIG. 1 is a perspective view of one illustrative embodiment of a coupling according to the present disclosure.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 2:
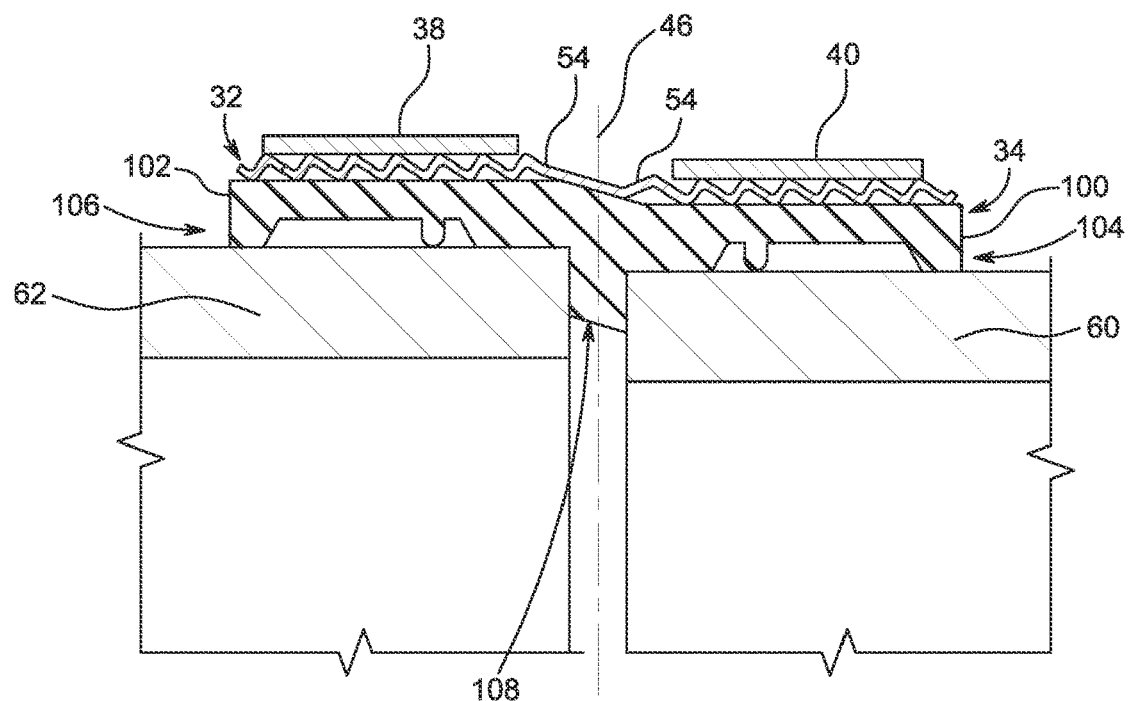
FIG. 2 is a partial sectional view of the coupling of FIG. 1 joining pipe segments together, showing the coupling assuming a shouldered shape to ensure secure clamping of a gasket and a shield to the pipe segments.

A coupling 30 is illustrated in FIG. 1. The coupling 30 has a stainless steel shield 32 that covers an elastomeric gasket 34. The coupling 30 is provided with clamping bands 38, 40 that are configured to securely clamp the coupling 30 to two pipe segments as suggested by FIG. 2. The clamping bands 38, 40 are retained to the shield 32 by rivets 44. In other embodiments, the clamping bands 38, 40 may be retained to the shield 32 by other suitable fastening devices, or may not be retained to the shield 32. The coupling 30 reduces the circumference of the shield 32 without causing excessive wrinkling of the shield 32 and the gasket 34 and associated leakage (which could result if there were excessive wrinkling of the shield and gasket). Additionally, the coupling 30 provides the ability of the shield 32 to assume a shouldered shape and thereby provide good compression of the gasket 34 to the pipe segment. The coupling 30 also increases resistance to pull-out forces F, as further described below with reference to FIG. 4. Except as discussed below, the coupling 30 has similar features and operation to the coupling 30 disclosed in U.S. Pat. No. 5,431,458, which is incorporated by reference herein in its entirety, In the illustrative embodiment, before the clamping bands 38, 40 are tightened around respective pipe segments, the coupling 30 is substantially symmetrical about a plane 46 passing through the middle of the coupling, as shown in FIG. 2, and reference will be made herein to "medial" and "lateral" portions of the coupling. It will be understood that the term "medial" will refer to parts of the coupling 30 that are closer to the plane 46, while "lateral" will refer to portions of the coupling components that are closer to the nearest edge 48 or 50 of the coupling 30. It is contemplated that, in other embodiments, the coupling 30 may be asymmetrical about the plane 46.

Referring to FIGS. 1 and 2, the shield 32 is provided with intermittent corrugations to provide evenly-spaced circumferential reduction of the shield 32 and gasket 34 to accommodate pipe segments having varying diameters. A limited number of parallel corrugations 52 are oriented in the direction parallel to a central axis 55 of the coupling 30 and arranged in discrete areas in numerous places along the length of the shield. The parallel corrugations 52 may be of ¼ inch widths with a 0.100 inch peak-to-peak spacing of the corrugations. The parallel corrugations 52 may be located every ¾ inches about the shield 32. The effect of these small sections of parallel corrugations 52 is that each corrugation 52 absorbs a portion of the total circumferential contraction when the shield 32 is installed upon pipe segments of varying diameters. The parallel intermittent corrugations 52 collapse in an accordion fashion about the smaller diameter pipe, and cannot come out of their shape since they are too short and are adjoined by tangentially stiff sections of transverse corrugations 54.

The parallel corrugations 52 are separated by transverse corrugations 54, which are about ½ inch in length in the illustrative embodiment. The transverse corrugations 54 allow the shield 32 to readily assume a shouldered shape, as suggested in FIG. 2, and to impede gasket movement. The transverse corrugations 54 are oriented at right angles to the direction of motion of the pipe as it is being pulled out of the coupling 30.

Figure 4:
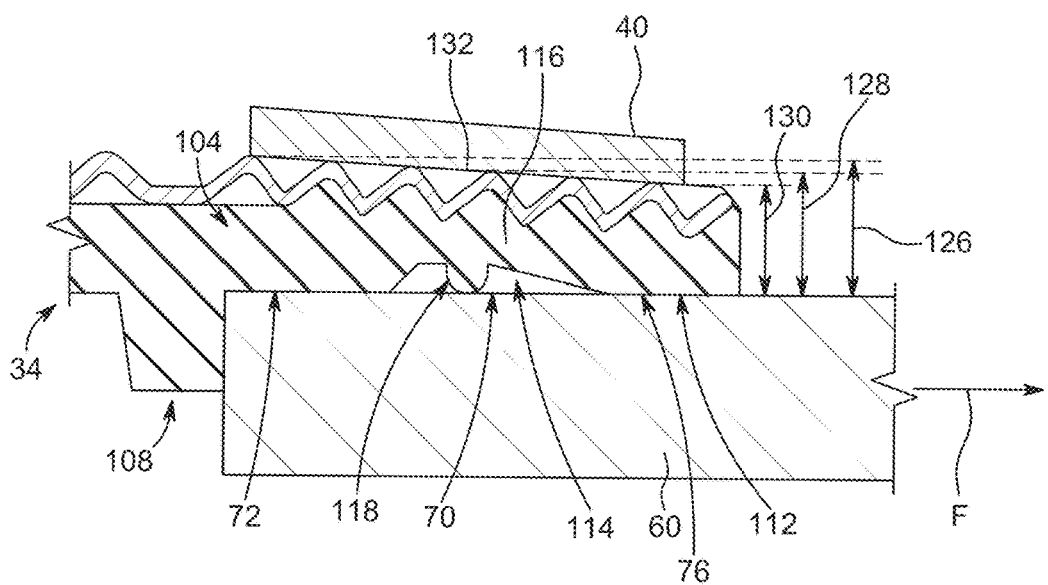
FIG. 4 is an enlarged sectional view of the portions of the pipe segment and the coupling shown in FIG. 3, but with the clamping band tightened, showing the cooperation of the shield, gasket, and clamping band to form a restriction, impeding the movement of the gasket relative to the pipe segment.

As a consequence of tightening of the clamping bands 38, 40, a portion of the gasket 34 may be forced into the transverse corrugations 54 due to the resiliency or flexible nature of the gasket 34, as illustrated in FIG. 4. This forcing of a portion of the gasket 34 into the transverse corrugations 54 results in a mechanical lock-up between the gasket 34 and the corrugations 52, 54 and impedes the movement of the gasket 34 relative to the shield 32. To enhance this impedance to movement, the transverse corrugations 54 are provided with a saw tooth shape. The saw tooth shape of the transverse corrugations is such that the acute angle formed by a medial portion of the corrugation and the plane of the shield is less than the acute angle formed by a lateral edge of the corrugation relative to the plane of the shield. In other words, the steeper sloping side of the corrugation is the lateral side of the corrugation.

The transverse corrugations 54 permit the shield 32 to assume a shouldered shape, as suggested in FIG. 2. This result is achieved because the corrugations 54 offer little or no resistance to bending over to accommodate the smaller diameter pipe 60 (above the inherent resistance that exists in the stainless steel shield 32). This resistance is relatively low and does not impede the ability of the shield 32 to assume the shouldered shape when the clamping bands 38, 40 are tightened. In some embodiments, there are no gaps between the shield 32 and the gasket 34 or between the gasket 34 and the pipe segments 60 and 62 after the bands 38 are tightened.

Figure 3:
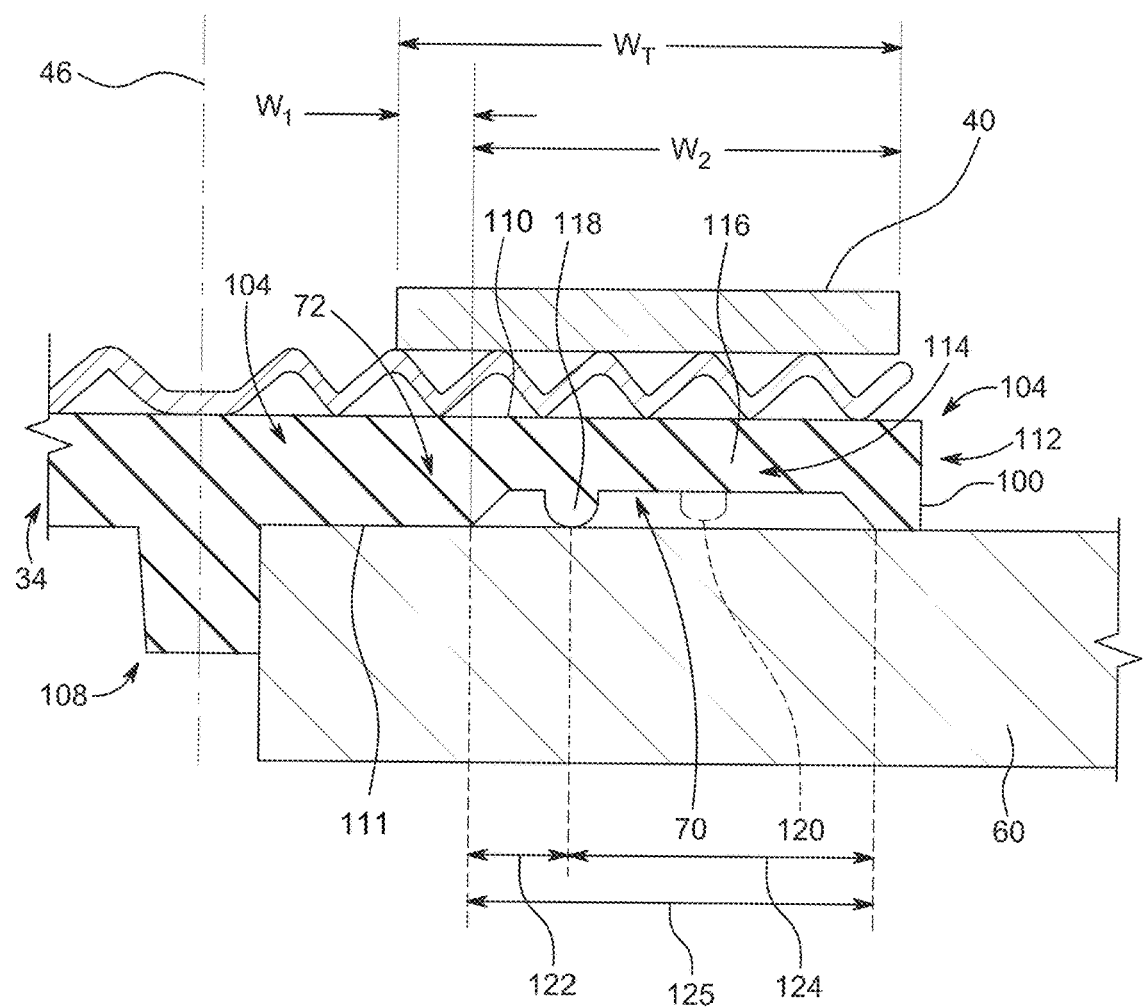
FIG. 3 is an enlarged sectional view of portions of a pipe segment and the coupling of FIG. 1 with a clamping band untightened, showing the relationship between a width of the clamping band and widths of a thickened region and a groove of the gasket.

Referring to FIGS. 3 and 4, at times, one of the pipes 60, 62 and/or the gasket 34 may be subjected to a shearing force F relative to the other components. In one example, as the pipe 60 experiences force F and the gasket 34 is pulled away from the shield 32 with force F, the thickness of the rubber being pulled under the clamping band 40 increases, thereby increasing the resistance to pull-out forces F. Referring to FIG. 3, the gasket 34 has a groove 70 of width $W_2$ (parallel to the central axis 55) under each band 38, 40 that is approximately ¾ of the width $W_T$ of each band 38, 40. Adjacent to each groove 70 in the medial direction is a thickened region 72 of width $W_1$, which is also disposed under the band 40. When the clamping bands 38, 40 are tightened, as shown in FIG. 4, the clamping bands 38, 40 each squeeze a portion of the groove 70 into contact with the pipe segment 60, 62, causing the clamping bands 38, 40 to each tilt slightly to an inclined orientation relative to the central axis 55 and form restriction areas 76. As the gasket 34 attempts to move out from under the shield 32 due to pull-out forces F, wedges of rubber formed at the thickened region 72 of the gasket 34 are required to pass under the restriction areas 76 of the clamping bands. This produces an interference fit between the gasket 34 and shield 32 and between the gasket 34 and the pipes 60, 62, impeding the movement of the gasket 34 relative to the pipes 60, 62 and the shield 32.

The gasket 34 is also configured to improve sealing between the coupling 30 and the pipes 60, 62. The gasket 34 extends circumferentially around the central axis 55, as shown in FIG. 1, and extends from one end 100 to another end 102, as shown in FIG. 2. The gasket 34 includes a pipe-coupling segment 104 configured to couple to pipe 60, a pipe-coupling segment 106 configured to couple to pipe 62, and a pipe-spacing segment 108 between the pipe-coupling segments 104, 106 and between the pipes 60, 62. In the illustrative embodiment, prior to the clamping bands 38, 40 being tightened, the pipe-coupling segments 104, 106 are substantially symmetrical relative to plane 46 passing through the middle of the pipe-spacing segment 108. In some embodiments, the pipe-spacing segment 108 may be omitted such that pipe-coupling segments 104, 106 are coupled directly to one another at plane 46. Only the pipe-coupling segment 104 is shown in FIGS. 3 and 4 and described below; however, the disclosure relating to the pipe-coupling segment 104 also generally applies to the pipe-coupling segment 106 of the illustrative embodiment. In other embodiments, the coupling 30 may be asymmetrical about the plane 46.

The pipe-coupling segment 104 extends axially from the pipe-spacing segment 108 to the end 100 of the gasket 34 as shown in FIG. 3. The pipe-coupling segment 104 has a radially outer surface 110 that is spaced a generally constant distance from the central axis 55 (prior to the clamping band 40 being tightened). The pipe-coupling segment 104 also has a radially inner surface 111 facing the central axis 55 that varies in distance from the central axis 55 to provide the sealing and pull-out resistance improvements described herein. The pipe-coupling segment 104 includes a thickened section 72 coupled to the pipe-spacing segment 108, a thickened section 112 at the end 100 of the gasket 34 and a sealing section 114 extending between and interconnecting the thickened sections 72, 112. The sealing section 114 has a radial thickness less than a radial thickness of the thickened sections 72, 112 to provide a channel or groove 70 in the gasket 34, located between the gasket 34 and the pipe 60.

The sealing section 114 includes a circumferential support band 116 and a sealing rib 118 coupled to a radially inner surface of the support band 116 as shown in FIGS. 3 and 4. Both the support band 116 and the sealing rib 118 extend annularly around the central axis 55. The groove 70 is defined radially inward of the support band 116 between the pipe 60 and the support band 116. The sealing rib 118 extends radially inward from the support band 116 into the groove 70 to contact the pipe 60 when the coupling 30 is installed on the pipe 60. The sealing section 114 may further include additional sealing ribs 120 in addition to sealing rib 118 to further increase sealing and pull-out resistance, as suggested in FIG. 3.

The sealing rib 118 is configured to provide improved sealing between the gasket 34 and the pipe 60. When the clamping band 40 is tightened on the shield 32 and the gasket 34, the gasket 34 deforms and closes part of the groove 70, as shown in FIG. 4. The sealing rib 118 maintains spacing between the a portion of support band 116 and the pipe 60 while allowing the clamping band 40 to assume an inclined orientation relative to axis 55 and the gasket 34. Thus, the pull-out resistance of the coupling 30 is maintained while sealing between the gasket 34 and the pipe 60 is improved by the sealing rib 118. It is contemplated that, in some embodiments, the clamping band 40 may be positioned slightly more medially than shown in FIG. 3 (e.g., such that a lateral-most portion of groove 70 does not lie under the clamping band 40). Clamping band 38 may similarly be positioned slightly more medially than illustrated. When used, this more medial positioning of the clamping bands 38, 40 (relative to the grooves 70 of the gasket 34) results in the tightened clamping bands 38, 40 assuming inclined orientations with even greater degrees of tilt.

The sealing rib 118 in the illustrative embodiment is spaced a distance 122 from the thickened section 72 and a distance 124 from the thickened section 112, as shown in FIG. 3. The distance 122 is less than the distance 124 to cause the clamping band 40 to tilt downwardly at or near the end 100 of the gasket 34. In the illustrative embodiment, the distance 122 is less than half of a total distance 125 from the thickened section 72 to the thickened section 112. In some embodiments, the distance 122 is about ¼ the total distance 125. In some embodiments, the distance 122 is about ⅓ the total distance 125. The term "about" is used to account for manufacturing tolerances that would be appreciated by one of ordinary skill in the art and can may vary by 2% of the stated value relative to the total distance 125. If one or more additional sealing ribs 120 are included in the gasket 34, the additional sealing ribs 120 may be spaced apart from the sealing rib 118 by a distance about equal to distance 122. In one embodiment, only one additional sealing rib 120 is included and is about equidistant from each thickened region 72, 112 and no sealing ribs are located between additional sealing rib 120 and thickened region 112 to allow the band 40 to assume the inclined orientation when tightened, as described above.

In the inclined orientation, the clamping band 40 is spaced a radial distance 126 from the pipe 60 at the thickened section 72, a radial distance 128 from the pipe 60 at the sealing rib 118, and a radial distance 130 from the pipe 60 at the thickened section 112. The radial distance 126 is greater than the radial distances 128, 130, and the radial distance 128 is greater than the radial distance 130. The sealing rib 118 increases the radial distances 128, 130 compared to what the radial distances 128, 130 would be without the sealing rib 118. This provides an increased force on the pipe 60 from the gasket 34 at the sealing rib 118 while also increasing a number of points-of-contact between the gasket 34 and the pipe 60 to improve sealing therebetween while maintaining pull-out resistance. In the illustrative embodiment, the sealing rib 118 is positioned in a center 132 of the clamping band 40 (i.e. radially below the center) after the clamping band 40 is tightened.

Providing the sealing rib 118 between the thickened sections 72, 112 also allows coupling device 30 to be simplified compared to other coupling devices. For example, the increased sealing provided by sealing rib 118 allows a total axial length of coupling device 30 to be reduced while maintaining the pull-out resistance of coupling 30. Additionally, the increased forces acting between clamping band 40 and pipe 60 through sealing rib 118 allows the number of clamping bands included in coupling 30 to be reduced while maintaining the improved sealing and pull-out resistance of coupling 30. Accordingly, the number of clamping bands included in the coupling 30 may consist of only the clamping bands 38, 40 in some embodiments.

In the illustrative embodiment, the sealing rib 118 has a convex, dome shape relative to the central axis 55 when viewed in cross section, as shown in FIGS. 2-4. However, other sealing ribs 218, 318, 418 may have a different shapes, as shown in FIGS. 5-7.

Figure 5:
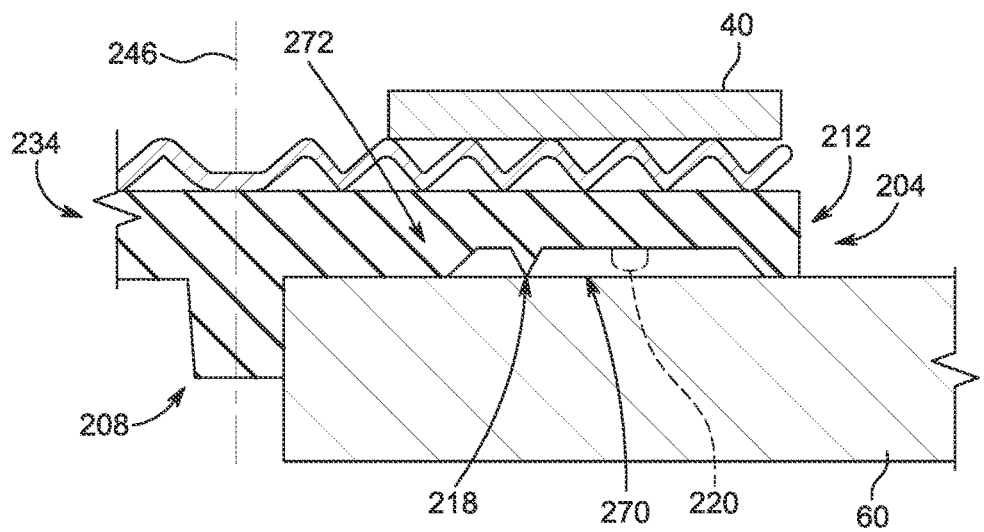
FIG. 5 is an enlarged sectional view of portions of a pipe segment and a coupling, similar to FIG. 3, but with the coupling including an alternative gasket.

Another embodiment of a gasket 234 that can be used with shield 32 and clamping bands 38, 40 is shown in FIG. 5. The gasket 234 is substantially similar to gasket 34 of FIGS. 1-4. Accordingly, similar reference numbers in the 200 series are used to reference common features between gaskets 34 and 234, and the description of those features is set forth above with reference to gasket 34. The gasket 234 includes a sealing rib 218 having a generally v-shaped cross section as shown in FIG. 5. It is believed that the v-shaped cross section of the sealing rib 218 may increase sealing effects of the sealing rib 218 due to the pointed contact with the pipe 60.

Figure 6:
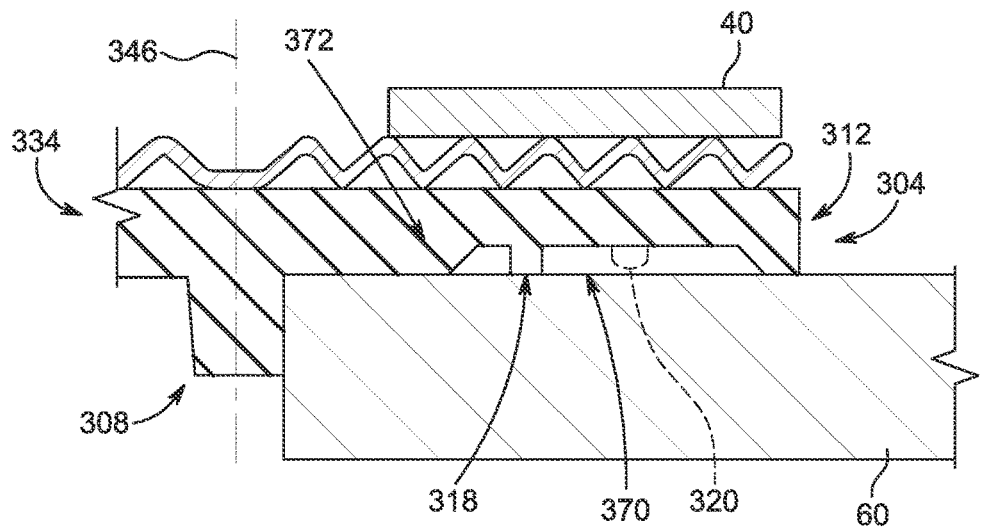
FIG. 6 is an enlarged sectional view of portions of a pipe segment and a coupling, similar to FIG. 3, but with the coupling including another alternative gasket.

Another embodiment of a gasket 334 that can be used with shield 32 and clamping bands 38, 40 is shown in FIG. 6. The gasket 334 is substantially similar to gasket 34 of FIGS. 1-4. Accordingly, similar reference numbers in the 300 series are used to reference common features between gaskets 34 and 334, and the description of those features is set forth above with reference to gasket 34. The gasket 334 includes a sealing rib 318 having a generally square-shaped cross section as shown in FIG. 6. It is believed that the square-shaped cross section of the sealing rib 318 may increase forces on pipe 60 by sealing rib 318 due to the increased surface area of contact with pipe 60.

Figure 7:
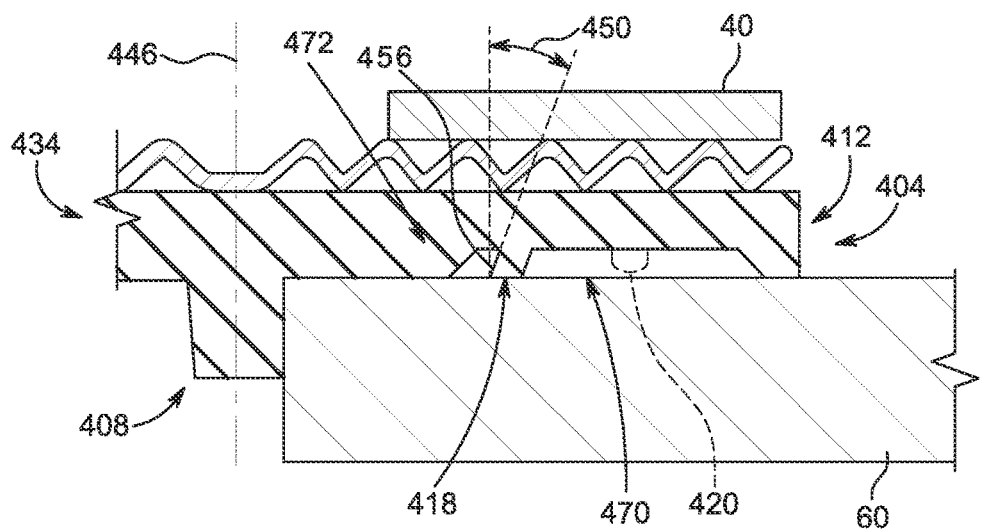
FIG. 7 is an enlarged sectional view of portions of a pipe segment and a coupling, similar to FIG. 3, but with the coupling including yet another alternative gasket.

Another embodiment of a gasket 434 that can be used with shield 32 and clamping bands 38, 40 is shown in FIG. 7. The gasket 434 is substantially similar to gasket 34 of FIGS. 1-4. Accordingly, similar reference numbers in the 400 series are used to reference common features between gaskets 34 and 434, and the description of those features is set forth above with reference to gasket 34. The gasket 434 includes a sealing rib 418 having a generally rhombus-shaped cross section as shown in FIG. 7. The sealing rib 418 has a surface 456 facing plane 446 that is arranged at an acute angle 450 relative to plane 446. When the pipe 60 experiences a pull-out force F, the sealing rib 418 can deform to cause the angle 450 to decrease, thereby causing sealing rib 418 to apply a greater force between clamping band 40 and pipe 60 and increase sealing effects and pull-out resistance.

While certain illustrative embodiments have been described in detail in the drawings and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the couplings described herein. It will be noted that alternative embodiments of the couplings of the present disclosure may not include all of the features described yet still benefit from at least some of the advantages of such features. Those of ordinary skill in the art may readily devise their own implementations of the couplings described herein that incorporate one or more of the features of the present disclosure. For example, the components and dimensions described herein are dictated somewhat by the size of the coupling and the corresponding pipe segments, and the spacing of the transverse and parallel corrugation areas may be modified accordingly.

The invention claimed is:

1. A coupling configured to connect to an end of a pipe, the coupling comprising:
   a shield configured to surround the end of the pipe;
   a clamping band configured to be tightened around the shield and the end of the pipe; and
   an elastomeric gasket configured to lie between the shield and the pipe, the elastomeric gasket comprising:
   a first thickened region,
   a second thickened region spaced apart from the first thickened region,
   a circumferential support band interconnecting the first and second thickened regions, the circumferential support band being spaced apart from the pipe before the clamping band is tightened to provide a groove between the first and second thickened regions, and
   a sealing rib coupled to a radially inner surface of the circumferential support band and arranged to lie within the groove in contact with the pipe, wherein the sealing rib has a rhombus-shaped cross section, wherein a surface of the sealing rib facing the first thickened region defines an acute angle with a plane perpendicular to a central axis of the coupling, and wherein the acute angle is configured to decrease in response to exertion of a pulling force on the pipe in a direction away from the plane.

2. The coupling of claim 1, wherein the second thickened region provides an axial end of the elastomeric gasket.

3. The coupling of claim 2, wherein the sealing rib is arranged closer to the first thickened region than to the second thickened region.

4. The coupling of claim 2, wherein the groove has a total length between the first and second thickened regions, and wherein the sealing rib is spaced from the first thickened region by a distance that is less than ⅓ of the total length.

5. The coupling of claim 4, wherein the distance is less than ¼ of the total length.

6. The coupling of claim 1, wherein, after being tightened, the clamping band is configured to assume an inclined orientation relative to a central axis of the coupling.

7. The coupling of claim 6, wherein, prior to tightening the clamping band, the entire radially inner surface of the circumferential support band of the elastomeric gasket is spaced apart from the pipe, and wherein, after tightening the clamping band, a first portion of the radially inner surface of the circumferential support band engages the pipe while the sealing rib maintains spacing between a second portion of the radially inner surface of the circumferential support band and the pipe.

8. The coupling of claim 1, wherein the sealing rib is a first sealing rib, and wherein the elastomeric gasket further comprises a second sealing rib coupled to the radially inner surface of the circumferential support band and located axially between the first sealing rib and the second thickened region.

9. The coupling of claim 8, wherein the first sealing rib is arranged closer to the first thickened region than the second thickened region, and wherein the second sealing rib is spaced from the second thickened region by at least half of a distance between the first and second thickened regions.

10. A method comprising:
    inserting an end of a first pipe into a first end of a coupling such that a first portion of an elastomeric gasket of the coupling is positioned between the end of the first pipe and a first clamping band of the coupling, wherein the first portion of the elastomeric gasket comprises (i) a first thickened region, (ii) a second thickened region spaced apart from the first thickened region, (iii) a first circumferential support band interconnecting the first and second thickened regions and cooperating with the first and second thickened regions to provide a first groove adjacent the first pipe, and (iv) a first sealing rib coupled to the first circumferential support band and arranged to lie within the first groove in contact with the first pipe; and
    tightening the first clamping band around the first portion of the elastomeric gasket.

11. The method of claim 10, further comprising:
    inserting an end of a second pipe into a second end of the coupling such that a second portion of the elastomeric gasket of the coupling is positioned between the end of the second pipe and a second clamping band of the coupling, wherein the second portion of the elastomeric gasket comprises (i) a third thickened region, (ii) a fourth thickened region spaced apart from the third thickened region, (iii) a second circumferential support band interconnecting the third and fourth thickened regions and cooperating with the third and fourth thickened regions to provide a second groove adjacent the second pipe, and (iv) a second sealing rib coupled to the second circumferential support band and arranged to lie within the second groove in contact with the second pipe; and
    tightening the second clamping band around the second portion of the elastomeric gasket.

12. The method of claim 11, wherein the coupling further comprises a shield positioned between the elastomeric gasket and the first clamping band and between the elastomeric gasket and the second clamping band.

13. The method of claim 10, wherein tightening the first clamping band causes the first clamping band to move from a parallel orientation, in which the first clamping band is substantially parallel to an outer diameter of the first pipe, to an inclined orientation, in which the first clamping band is arranged at an angle relative to the outer diameter of the first pipe.

14. The method of claim 13, wherein a first portion of a radially inner surface of the first circumferential support band of the elastomeric gasket moves toward and engages the outer diameter of the first pipe as the first clamping band moves from the parallel orientation to the inclined orientation, but the first sealing rib maintains spacing between a second portion of the radially inner surface of the first circumferential support band and the outer diameter of the first pipe.

* * * * *